(12) United States Patent
Rust et al.

(10) Patent No.: US 6,870,466 B2
(45) Date of Patent: Mar. 22, 2005

(54) DATA DISPLAY SYSTEM AND METHOD FOR AN OBJECT TRAVERSING A CIRCUIT

(75) Inventors: Robert A. Rust, Boise, ID (US); Barry J Oldfield, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 10/116,183

(22) Filed: Apr. 3, 2002

(65) Prior Publication Data
US 2003/0189484 A1 Oct. 9, 2003

(51) Int. Cl.$^7$ ............................................... G08B 23/00
(52) U.S. Cl. .................. 340/323; 340/565; 340/309.16; 340/573.1
(58) Field of Search .......................... 340/323, 323 R, 340/565, 572.1, 10.52, 825.69, 309.16, 815.44, 573.1; 377/24.2, 5

(56) References Cited

U.S. PATENT DOCUMENTS

| | | | | |
|---|---|---|---|---|
| 4,823,367 A | * | 4/1989 | Kreutzfeld | 377/24.2 |
| 5,125,010 A | * | 6/1992 | Lee et al. | 377/24.2 |
| 5,136,621 A | * | 8/1992 | Mitchell, et al. | 377/24.2 |
| 5,557,085 A | | 9/1996 | Tyren et al. | 235/380 |
| 5,585,871 A | * | 12/1996 | Linden | 351/158 |
| 5,685,722 A | * | 11/1997 | Taba | 434/254 |
| 5,751,223 A | | 5/1998 | Turner | 341/67 |
| 5,812,049 A | * | 9/1998 | Uzi | 340/323 R |
| 6,130,859 A | | 10/2000 | Sonnenschein et al. | 367/134 |
| 6,144,301 A | | 11/2000 | Frieden | 340/572.8 |
| 6,144,620 A | * | 11/2000 | dePoortere | 368/108 |
| 6,222,452 B1 | | 4/2001 | Ahlstrom et al. | 340/572.1 |
| 6,714,133 B2 | * | 3/2004 | Hum et al. | 340/573.4 |

* cited by examiner

Primary Examiner—Phung Nguyen

(57) ABSTRACT

A method and apparatus for monitoring the movement of an object traversing a circuit and outputting data with respect thereto. Lap events are recorded and used to calculate a total lap count, split time, and elapsed time for an event that includes the repetitive traversing of a circuit. Physiologic data is monitored in the case where the object is a person. A transponder or transmitter is affixed to a user and a signal having limited range is coupled to a communications and display device when the user comes into range of the device. Each such coupling is accumulated as lap event data. Calculations are made to display the lap count and timing information as well as physiologic data. In one embodiment, the device is implemented in a watertight housing and placed at the bottom of a swimming pool. The displayed information is visible to a swimmer wearing the transponder or transmitter. In another embodiment, the display is incorporated into eyewear worn by the person traversing a repetitive circuit.

37 Claims, 5 Drawing Sheets

DATA DISPLAY SYSTEM AND METHOD FOR AN OBJECT TRAVERSING A CIRCUIT

BACKGROUND OF THE INVENTION

1. Field of the Invention

The present invention relates to data display systems and displays. More specifically, the present invention relates to automated systems and methods for monitoring athletic performance.

2. Description of the Related Art

Swimming, running, walking, cycling, rowing, skating, and other means for traversing distances are common forms of exercise. Frequently, these exercises are performed in a venue where a predetermined circuit is repeatedly traversed. Each tour of such a circuit is commonly called a 'lap'. Frequently, many laps are completed in succession to define an event, such as a race or exercise session. A race has a total duration and each lap time is commonly referred to as a split. Thus, a split time relates to a single lap and a total number of laps relates to a total time for an event. An example of this is swimming laps in a swimming pool. A person engaging is such an exercise will typically plan to spend a particular amount of time, such as thirty minutes to an hour, swimming back and forth in a pool, or plan to complete a certain number of laps before completing an exercise session.

For example, in order to track the progress made in a pool, a swimmer must count the number of laps that have been completed. However, it is very common to lose track or forget the current lap number. Indeed, the number of laps can easily exceed fifty in a given session. Hence, mental lap counting can lead to confusion. Even if a swimmer does not have difficulty remembering the lap count, a considerable amount of attention may be spent on counting the laps. This causes a diversion of the swimmer's focus from breathing, technique, race strategy, or other matters that may be important in conjunction with the lap count.

It may also be important to keep track of such parameters as split time and elapsed time. Given that swimmers often wear goggles and despite the availability of anti-fogging technology, goggles often substantially obscure vision after a few laps as the swimmer's body heats up. Thus, it can be difficult for a swimmer to read a conventional timepiece during an event.

Currently, the typical manner by which swimmers stay apprised of the elapsed time is to pause and look up at a poolside clock or a waterproof wristwatch. Either of these approaches requires a break in the swimming pattern, which detracts from the rhythm and pace of the swimming activity and can result in a loss of time and competitiveness.

Others have fashioned devices that rely on physical contact as each lap is traversed. For example, devices may be placed at the end of a pool that operate mechanically to sense each lap as the swimmer turns and pushes off the pool side wall. However, these devices are susceptible to tampering, accidental or otherwise. In addition, pools often have many people moving around during exercise, practice and races, and it is common for a swimmer to share a lane of a pool with another swimmer. If a mechanical device is used to track the number of pushes made by a swimmer, there is a significant probability that counting and timing errors will be introduced by such other individuals.

Another aspect of physical activity is the exertion required and the stress that this exertion places on the human body. While it is desirable to elevate body functions in order to benefit from exercise, care must be taken to do so in a controlled, safe, manner. Athletes frequently desire to monitor their heart rate and blood-oxygen levels so as to control the level of stress and to maintain adequate oxygen levels. Blood-oxygen levels in swimmers are of particular concerns since the athletes must raise their head from the water to breathe. This can be done every stroke, every second stroke, or even every third stroke. Heart rate and blood oxygen levels can be monitored with sensing devices that attach to the fingertip and use light emitters and sensors to measure heart rate and blood-oxygen levels, but utilizing such devices during activities can be challenging. For example, a swimmer often needs real-time information about the exertion and stress levels so that adjustments can be made to level of effort and the frequency of breathing.

Thus, there is a need for an apparatus and method for tracking the number of laps in a repetitive circuit activity, for keeping accurate elapsed time measurements for both the total and split times, for monitoring heart rate and blood-oxygen levels, and for conveying such information to individual athletes.

SUMMARY OF THE INVENTION

The need in the art is addressed by the systems and methods taught by the present invention. An illustrative embodiment teaches a system for monitoring the movement of an object traversing a circuit and outputting data with respect thereto. The system includes a first wireless communications device affixed to the object and a second wireless communications device that communicates with the first communications device when they are located within at a predetermined proximity to one another. A controller is coupled to the first or the second communications device and monitors the communications and accumulates data therefrom. An output device is coupled to receive processed data from the controller. The data may be a lap count, a split time or an elapsed time. User input coupled to the controller can be employed such that activation of the user input causes the controller to reset the lap count and initialize a starting sequence. The controller may operate to execute a count down timer before initializing the starting sequence. In a particular application, the object is a person or a swimmer, and the first communications device and the second communications device are enclosed in waterproof housings. The output device is typically a visual display.

In a refinement to the foregoing embodiment, the apparatus further includes a means for activating the display while the communications devices are located within the predetermined proximity of one another. In another refinement, the presence of the first communications device within the predetermined proximity of the second communications device for a period of time greater than a threshold duration causes the controller to start an elapsed time interval timer when the first communications device moves beyond the predetermined proximity of the second communications device. The data can be communicated to an external device, such as a computer, by including an input/output interface coupled to the controller, where the input/output interface operates to communicate the data to an external device.

In a further refinement, the first communications device operates to communicate a unique identification codes as a part of the data. In a further refinement, the controller operates to decode a plurality of the unique identification codes and accumulates a plurality of data sets corresponding to them. In a particular embodiment, the first communications device is a transponder and the second communications device is a transceiver, and the controller is coupled to, and co-located with, the transceiver and the output device. Further, the transceiver is adapted to interrogate the transponder.

Another illustrative embodiment adds a physiologic sensor coupled to the first communications device that operates to communicate physiologic data there through. The controller is coupled to and co-located with the second communications device and the output device, and, the controller operates to receive the physiologic data that has been communicated by wireless communications, then, output processed physiologic data to the output device. The physiologic data may be heart rate or blood-oxygen level data. The physiologic sensor may be a finger cot sensor.

In another area of refinement, the output device is a visual display incorporated into an item of eyewear. When the object is a person swimming in a water circuit, the eyewear is swimmer's goggles.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is described herein in connection with a swimming application. However, those skill in the art will appreciate that the present teachings are also applicable to a variety of other applications including, by way of example, track and field events (running, walking, cycling, and etc.), rowing, skating, and motor sports such as automobile and motorcycle racing. In addition, those skilled in the art will appreciate that the present teachings are not limited to sporting applications.

The swimming pool example is of interest inasmuch as it involves environmental constraints introduced by water and the limitations these constraints place on an individual swimmer. In an aquatic environment, the senses of vision and hearing are challenged more so than in air. Consequently, communication of information to the swimmer is more problematic than other applications. Breathing must be coordinated with the swimmer's stroke and this affects the body's natural breathing rhythms, which can result in blood-oxygen level maintenance issues. Also, electronic equipment and communications techniques are constrained when operated under water.

Figure 1:
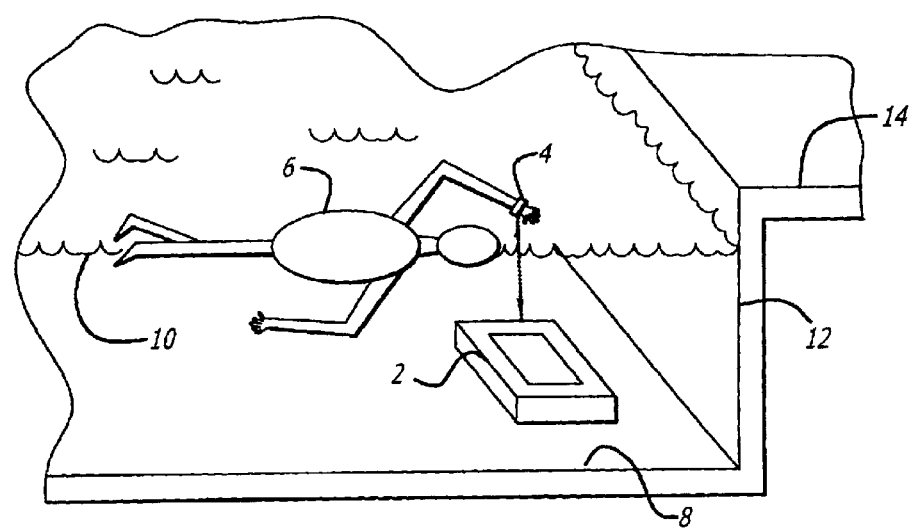
FIG. 1 is a diagram showing an operating environment for an illustrative embodiment of the present invention.

Reference is directed to FIG. 1, which illustrates an operational environment and an illustrative implementation of the teachings of the present invention in a swimming pool environment. An individual swimmer 6 swims laps in water 10 above a swimming pool floor 8. At the end of each lap, the swimmer 6 turns off the side wall 12 of the pool. The side wall terminates at the pool deck 14. A transponder or transmitter (generally, a "communications device") 4 is affixed to the swimmer 6, which in the illustration is accomplished with a wristband housing the electronic circuitry. In accordance with the present teachings, a communications link is established between the transponder or transmitter 4 and a lap counter and timer 2. The lap counter and timer 2 includes a second communications device (not individually shown). As will be appreciated by those skilled in the art, the range of the communication link is a matter of design choice. In the illustrative embodiment, the range is selected so that as the swimmer swims laps, the transponder or transmitter moves into and out of range of the lap counter and timer device.

The establishment of a communication link between the transponder or transmitter indicates that a lap of the circuit (i.e., the swimming pool) has been completed. The lap counter and timer device includes a time reference that allows it to calculate the duration of each lap, as well as the duration, or elapsed time, since the start of the event. Thus, the lap counter and timing device is enabled to track the number of laps completed, the split time for each of a plurality of laps, as well as the elapsed time for the entire event.

In the illustrative embodiment, the lap counter and timer device 2 rests on the bottom of the pool in a watertight housing. Battery power is preferred for operation of the device since it eliminates the requirement to connect to an external power supply. In the illustrative embodiment, the lap counter and timer device 2 has a display that faces upward and which employs large, readily visible characters. Light emitting diodes are preferred for this application as the bright illumination offers a high level of contrast, useful in the aquatic environment to facilitate viewing by the swimmer 6. The physical location and arrangement of the lap counter and timer device, combined with a readily visible display, enables the swimmer 6 to see the displayed lap count, split time, and elapsed time at the end of each lap. One advantage of this approach is that the swimmer need not alter the swim stroke to obtain this information, which is a limitation the prior art has failed to address. The wristband transponder or transmitter can be a passive or active device and is small and streamlined so as not to introduce adverse effects on the swimming activity.

The lap counter and timer actuation can be accomplished in several different modes. In one illustrative embodiment, a temporal approach is employed. During the normal course of swimming laps and traversing the circuit, the time duration when the transponder or transmitter 4 is in close proximity to, and thus in communications range with, the lap counter and timer device 2 is naturally brief as the swimmer 6 merely turns against the side wall 12 and proceeds to the next lap. However, prior to beginning the event, and at the conclusion of the event, the swimmer 6 typically pauses at a stationary position near the side wall 12 of the pool. In accordance with the present teachings, the lap counter and timer device 2 is adapted to monitor this time period (the length of time the transponder or transmitter and lap counter and timer device are in communications range) and react to stop and reset the counter and timers operating therein. The timers and counters begin normal operation when the swimmer 6 swims away from the lap counter and timer device 2 and thus moves out of communications range. A loss of the communications link initializes the device 2 to start counting and timing. Those skilled in the art will appreciate that this functionality and additional functionality may be implemented using a microprocessor with specifically programmed software.

Alternatively, an input device can be employed to allow the swimmer to manually stop, start, and reset the lap counter and timer device 2. Such an input device can be a momentary contact switch accessible through a waterproof membrane on the device 2, which is thus maintained in waterproof condition. Activation may be by foot or hand action of the swimmer.

Alternatively, a magnetically coupled input device, such as a Hall effect sensor and handheld magnet can be used. Similarly, a sonic device or a remote device using an electromagnetic, radio, infrared or light waves can be used as will be appreciated by those of ordinary skill in the art.

As noted above, a disadvantage of prior lap counting and timing devices has been the possibility of being affected or manipulated by others, either intentionally or accidentally. An advantage gained through the teachings of the present invention is the implementation of a unique identification system in the communication link between the transponder or transmitter and the lap counter and timer device. In the illustrative embodiment, the signals communicated include a unique transponder or transmitter identity signal. The information is modulated onto the signal and is decoded by the lap counter and timer. It is subsequently compared to a stored value to determine if a match occurred. This effectively discriminates each of the desired signals from any other non-desired signals that might be present. Thus, each event detected by the lap counter and timer is qualified as being linked to one or more particular transponder or transmitter identities. In addition to the effective privacy this affords a particular user, the teaching also enable the device to track a plurality of uniquely identified transponders of transmitters simultaneously. Thus, the present invention is readily capable of servicing plural users simultaneously.

The lap counter and timer devices according to the illustrative embodiments operate in conjunction with a transponder in a first embodiment and a transmitter in a second embodiment. A transponder is a device that is stimulated by an interrogation signal that is transmitted by the lap counter and timer device. The stimulation signal causes the transponder to emit a responsive signal that is encoded with the aforementioned identification signal. While this approach increases the complexity of the lap counter and timer device, it is advantageous because the transponder can be implemented as a passive device that requires no independent electrical power source. Such systems are understood by those possessing ordinary skill in the art and are currently implemented in card access systems used in building security, turnpike toll cards, and wave-by credit cards. U.S. Pat. No. 6,130,859 issued Oct. 10, 2000 to Sonnenschein et al. entitled METHOD AND APPARATUS FOR CARRYING OUT HIGH DATA RATE AND VOICE UNDERWATER COMMUNICATION, the teachings of which are incorporated herein by reference thereto, discusses certain details of underwater ultrasonic transmissions. In addition, U.S. Pat. No. 6,222,452 issued to Ahlstrom, et al. entitled ELECTRONIC IDENTIFICATION TAG; U.S. Pat. No. 6,144,301 issued to Frieden entitled ELECTRONIC TRACKING TAG; U.S. Pat. No. 5,751,223 issued to Turner entitled ELECTRONIC IDENTIFICATION SYSTEM; and U.S. Pat. No. 5,557,085 to Tyren, et al. entitled METHOD AND DEVICE FOR ELECTRONIC IDENTIFICATION, the teachings of each which are hereby incorporated herein by reference thereto, all teach technology related to the aforementioned transponder system. Furthermore, useful product information is available via the Internet at World Wide Web URL's:

http://members.aol.com/herian/heusline.htm
http://www.trovan.com/TRANSP-1. HTM

According to the teachings of the present invention, the transmitter in the lap counter and timer device repetitively interrogates for a transponder within its communications range by repetitively transmitting an interrogation signal. When no transponder is within communications range, there is no responsive identification signal received, and thus no swimmer present. On the other hand, when there is a transponder in range, the responsive identification signal is produced and received, and this the lap counter and timer device is enabled to determine the presence of the transponder.

The second illustrative embodiment of the lap counter and timer device operates in conjunction with a transmitter. In this embodiment, the transmitter is an active device, requiring its own power source, which repetitively transmits an identification signal over a limited communications range. The lap counter and timer device implements the corresponding receiver. The presence of the transmitter within the communications range is determined by the repetitive receipt of the identification signal. In either of the illustrative embodiments, the frequency of the repetitive signal is a matter of design choice, and defines the minimum resolution in time of the various timing event contemplated herein. For amateur use, a repetition rate of ten per second is reasonable. For serious competitive events, a repetition rate of one hundred per second may be preferred.

The communications link in any of the illustrative embodiments can be established with any of a variety of communications technologies that are now understood, or later become available, to those skilled in the art. The choices include, but are not limited to, visible light links, infrared light links, acoustic links, including ultra-sound, as well as various other frequencies of electromagnetic energy. A low frequency electromagnetic carrier is useful in an aquatic environment.

Figure 2:
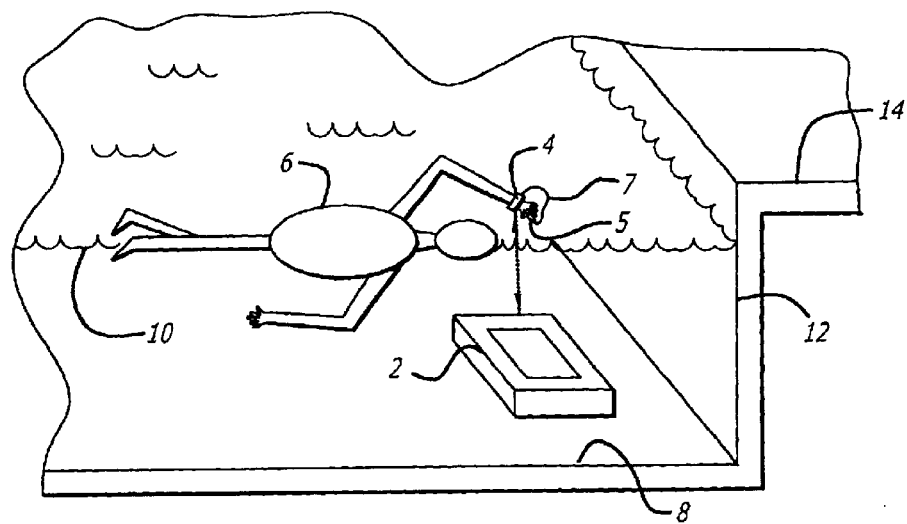
FIG. 2 is a diagram showing an operating environment for an illustrative embodiment of the present invention.

FIG. 2 is a diagram showing an operating environment for an illustrative embodiment of the present invention that employs a physiologic sensor. As noted above, many athletes desire to monitor certain physiological parameters, in addition to the aforementioned split time, elapsed time and lap counts. Those skilled in the art are familiar with the finger cot sensor that employs a light emitting diode and photodetector sensor and that are capable of monitoring heart rate and blood-oxygen levels. FIG. 2 illustrates a swimmer 6 in water 10 with various structures described with like reference numerals as per FIG. 1. FIG. 2 illustrates the addition of a finger cot style physiologic sensor 5 that is coupled to the wristband style communications device 4 with a wire cable 7. With the addition of the finger cot sensor 5, physiologic data is coupled to the wristband 4 where it is coupled with the aforementioned identification data and transmitted by the communications device to the display unit 2 on the pool floor. In this illustrative embodiment, the display unit 2 also displays the swimmer's heart rate and blood-oxygen levels each time the swimmer moves into the predetermined communication range of the unit 2. Thus, at the end of each lap of the swimming circuit, the swimmer 6 is able to look down to see the display unit 2 at the bottom of the pool. The swimmer is then informed as to the heart rate and blood oxygen levels, as well as the lap and time data, and can make adjustments to the level of effort as needed.

Figure 3:
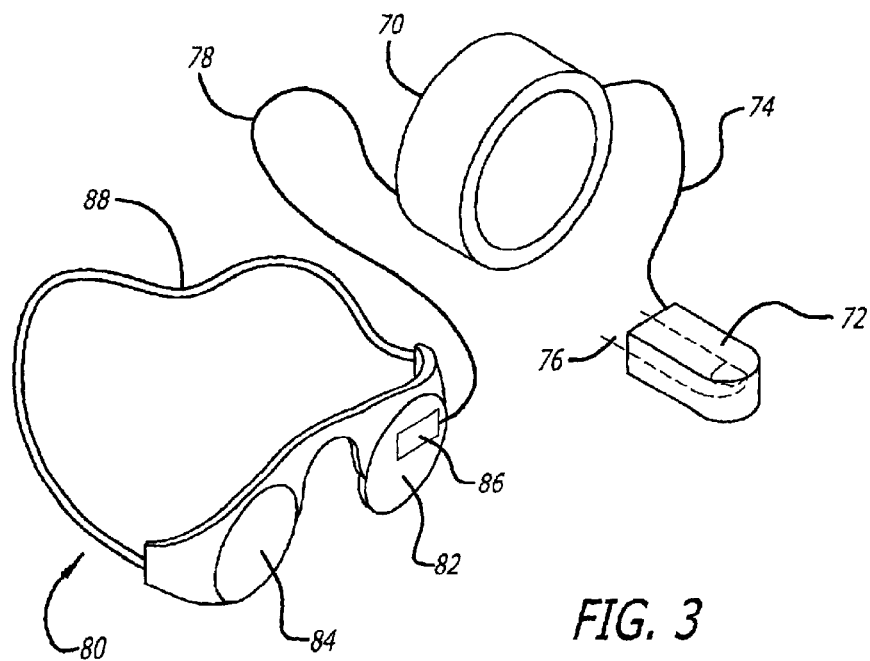
FIG. 3 is diagram of a goggle display in accordance with an illustrative embodiment of the present invention.

FIG. 3 is a diagram of a goggle display in accordance with an illustrative embodiment of the present invention. This embodiment is a refinement of the present invention where the person utilizing the system is continuously informed as data is gathered and updated by the system. This is made possible through implementation of a display unit that moves with the person traversing the circuit. The embodiment illustrated in FIG. 3 is also directed to the swimming environment, but is applicable to many other applications as well. The display unit is a pair of swimmer's goggles 80 that incorporate a liquid crystal display 86 into one of the goggle 80 eyepieces 82. The other eyepiece 84 is of conventional design. The liquid crystal display 86 is positioned outside the central field of view and is visible to the swimmer by slightly averting the angle of view toward the liquid crystal display 86. A small lens group (not shown) is positioned between the liquid crystal display 86 and the eye so that the display is comfortably focused for viewing by the swimmer. Those skilled in the art are knowledgeable about such lens focusing groups.

The goggles are secured to the swimmer with an elastic strap 88 that couples the two eyepieces 84 and 82 about the swimmer's head. A thin wire cable 78 couples the display 86 to the electronics that are disposed within the wristband 70. Another thin wire cable couples from the electronics in the wrist band 70 to the finger cot physiologic sensor 72 that is positioned on the swimmer's finger 76 (shown in phantom). The functions of the circuitry disposed within wristband 70 will be more fully described hereinafter. It is noted that the lap events are detected through use of a transponder (not shown) disposed at the start/finish end of the circuit. A transceiver communications device (not shown in FIG. 3) in the wristband 70 interrogates the transponder to determine when the swimmer has entered the predetermined communications range. The lap count split times are updated and that information is written to the display 86. The elapsed time, heart rate, and blood-oxygen levels are continuously updated so that the information is available to the swimmer anytime it is desired.

Figure 4:
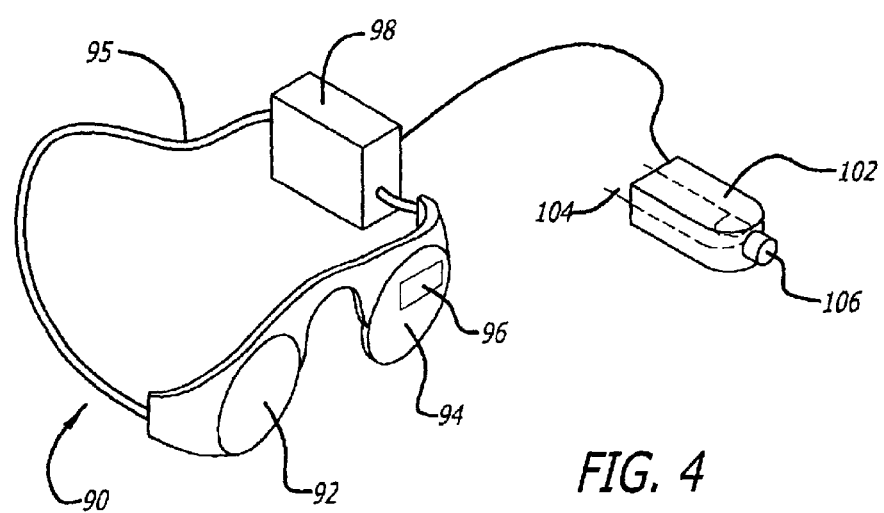
FIG. 4 is diagram of a goggle display in accordance with an illustrative embodiment of the present invention.

FIG. 4 is a diagram of a goggle display in accordance with an illustrative embodiment of the present invention in which a separate transponder communications device is not required. The illustrative embodiment of FIG. 4 comprises a pair of goggles 90 with a first eyepiece 92 and a second eyepiece 94 that are worn about the swimmer's head utilizing an elastic strap 95. A liquid crystal display 96 is disposed in eyepiece 94 such as that employed in the embodiment of FIG. 3. In FIG. 4, the electronics are alternatively located in a module 98 that is supported along the elastic head strap 95. This approach obviates the need for a wrist strap as applied in the previous embodiments. A thin wire cable extends from the module 98 to the finger cot sensor 102, which is disposed on the swimmer's finger 104 (shown in phantom).

Inasmuch as a second communications device, such as a transponder, is not employed to establish proximity of the swimmer along a certain portion of the circuit, another means for determining the lap events is required. The illustrative embodiment in FIG. 4 accomplishes this through the use of an actuator 106 disposed on the finger cot sensor 102. The actuator 106 is actuated each time the swimmer completes a lap, as well as at the beginning of the first lap. Actuation can be accomplished by pressing on the actuator 106 manually, or through impact with the pool side wall as the swimmer turns to change directions at the end of each lap. The actuator 106 is electrically coupled to the circuitry in the module 98 and stimulates a controller (not shown) to increment the lap count and mark split time intervals.

Figure 5:
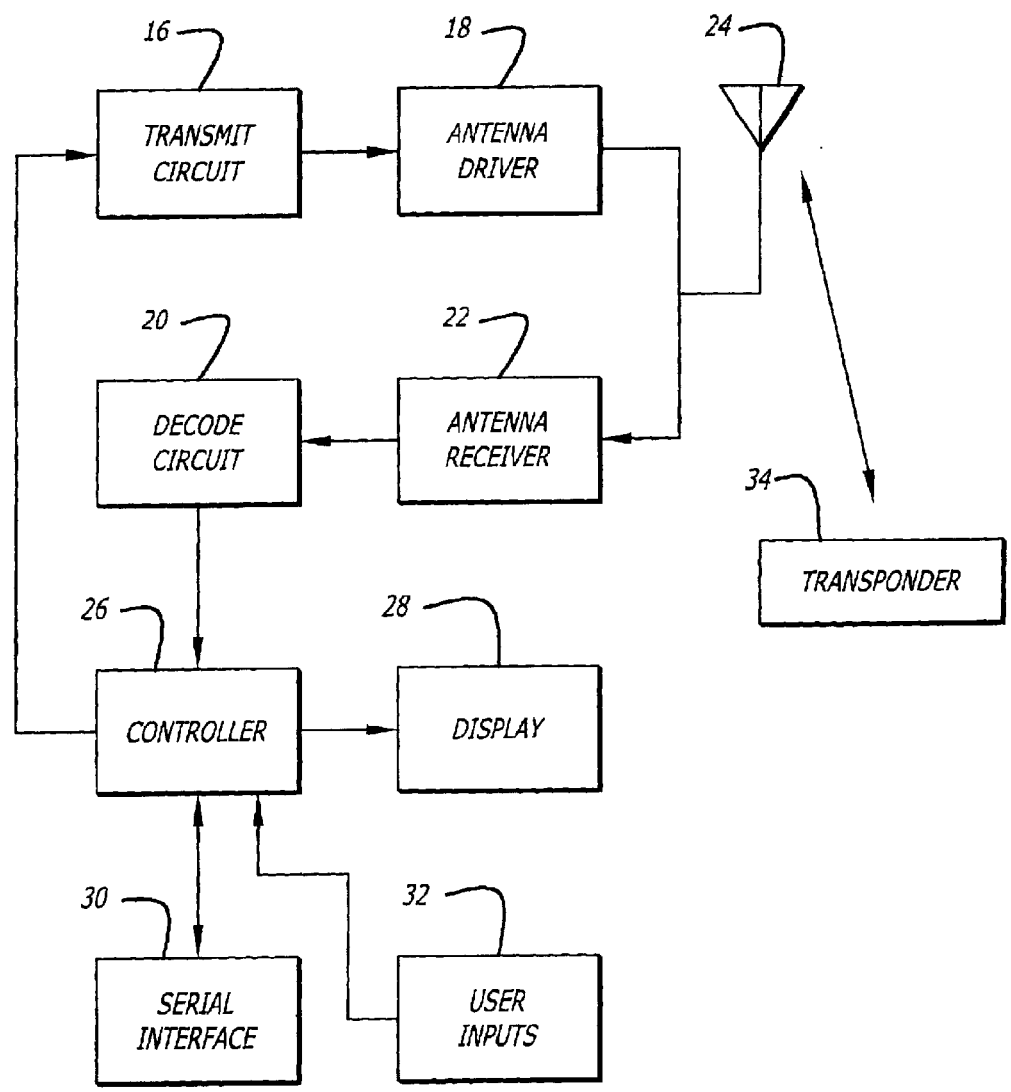
FIG. 5 is a functional block diagram in accordance with an illustrative embodiment of the present invention.

Reference is directed to FIG. 5, which is a functional block diagram of an illustrative embodiment of the present invention. The embodiment depicted in FIG. 5 is representative of the transponder embodiment, but differs only slightly (the addition of a transmitter 16 from the transceiver embodiment discussed respecting FIG. 1. An antenna 24 is employed since this embodiment utilizes an electromagnetic communications link. The antenna 24 receives a transmit interrogation signal from an antenna driver circuit 18, which sets the power and is thus the limiting factor with respect to the range of the device. The interrogation signal is generated by transmit circuit 16, which is controlled by controller 16. The repetition rate is programmed into the controller 26. Controller 26 may be any of the variety of processors, microprocessor, controllers, microcontrollers and other programmable devices as are understood by those having ordinary skill in the art.

The interrogation signal output by the antenna 24 is electromagnetically coupled to the transponder 34, which emits a responsive identification signal comprising the transponder's 34 unique identity. In the transmitter embodiment, the transmitter would be illustrated by reference numeral 34. In this case, the transmitter repetitively emits a transmitter identification signal. The identification signal is received by antenna 24 and is coupled to antenna receiver 22. The transmit and receive functions do not interfere with one another as they are multiplexed in time. The antenna receiver circuit demodulates the signal and couples it to decode circuit 20. Decode circuit 20 determines the unique one, or plural, transponder (or transmitter) identity(ies). The decode circuit 20 may alternatively be implemented in software in a controller 26. When a match of the received identity and an identity stored in the controller 26 is made, the controller 26 increments a lap count, measure and the time since the last lap count event, then calculates and displays on display 28 the lap count, split time, and elapsed time. It is to be understood that any limited subset of such information displayed is within the scope of the teachings herein.

The aforementioned user inputs are entered through user inputs circuit 32. As discussed herein before, this can include any of a variety of input devices. The information input is similar to that information entered into prior art lap counters and timers, such as set and resent functions, display formats, and other information. The present invention incorporates a countdown to start timer with corresponding display. This function allows the user to initialize a start sequence, such as by activating a user input, which is preceded by a countdown timer that gives the user time to get ready and set to begin the event. The duration of the count down timer is programmable by user selection.

During operation, the controller 26 gathers and stores lap-event data and marks it with respect to time by reference to an internal time reference in the device (not shown). The data is assembled into a database of information for use in the aforementioned calculations of laps, times and etc. The present invention includes a serial interface 30 coupled to the controller 26, which is useful for transferring this database of information to another device. By way of example, the user may desire to save the database by transferring it through serial interface 30 to a separate computing device. The data can then be further manipulated as desired by the user. Serial interface 30 can employ any of the interface technologies understood by those skilled 110 in the art, including but not limited to RS-232 serial port specifications, USB serial interface specifications, IEEE 1394 port specifications, or a wireless interface standard or proprietary scheme. Optical and sonic coupling are applicable as well.

Figure 6:
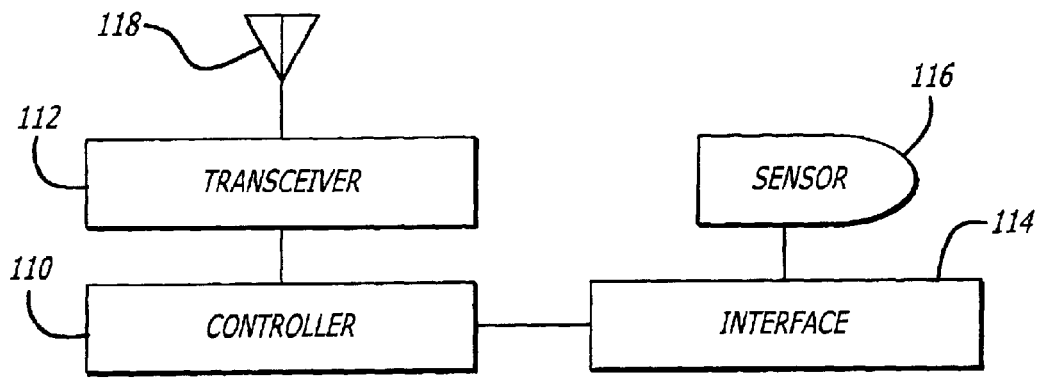
FIG. 6 is a functional block diagram of an illustrative embodiment of the present invention in accordance with the implementation depicted in FIGS. 2 and 3.

FIG. 6 is a functional block diagram of an illustrative embodiment of the present invention in accordance with the implementation depicted in FIGS. 2 and 3. In FIG. 6, the communications device employed is a wireless transceiver 112 that is coupled to an antenna 118. The transceiver communicates with a fixed wireless communications device (not shown) located at the bottom of the swimming pool. See item 2 in FIG. 2 for reference. The wireless communication link is designed for a predetermined communications range such that the two communications devices can communicate data only when they are within a predetermined distance of one another. A finger cot physiologic sensor 116 is coupled to an interface circuit 114 that drives the sensor 116 and produces suitable data output to controller 110. Sensors and interface circuits for detecting and coupling physiological data are known to those skilled in the art. The controller 110 may be any of the variety of processor, controllers, or computers known to those skilled in the art to be suitable for dedicated control applications.

As the sensor 116 gathers physiologic data, interface 114 couples this information to the controller 110 where it is temporarily stored. As the swimmer moves into communications range of the fixed communications device (not shown) the physiologic data is transferred by wireless communications to the fixed unit, where it is displayed along with the lap and timing data. The communication occurs repetitively as plural laps are completed and at each lap the swimmer is able to view the updated displayed data.

Figure 7:
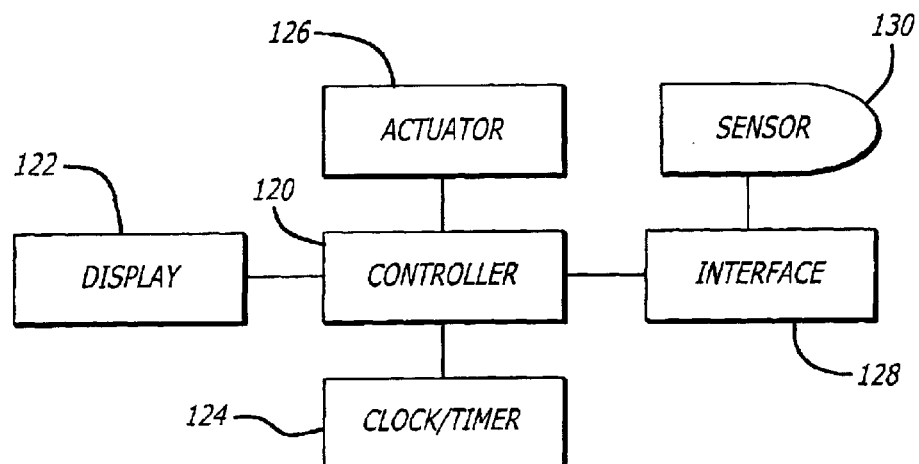
FIG. 7 is a functional block diagram of an illustrative embodiment of the present invention in accordance with the implementation depicted in FIG. 4.

FIG. 7 is a functional block diagram of an illustrative embodiment of the present invention in accordance with the implementation depicted in FIG. 4. In FIG. 7, a finger cot physiologic sensor 130 is coupled to an interface circuit 128 that outputs physiologic data to a controller 120. Controller 120 processes the physiologic data and writes it to display 122. In the illustrative embodiment, the display 122 is a liquid crystal display located in eyewear worn by the swimmer. However, those skilled in the art will appreciate that many types of displays would be suitable, depending on the activity and environment of the person utilizing the system. For example, a runner might prefer to have a wristband implementation of the system with a wristwatch like display. In addition to the physiologic information, lap and timing information is also written to the display 122 by the controller 120.

A clock-timer circuit 124 is coupled to the controller 120 and provides a timing reference for lap and split time measurements. Clock-timer circuits are known to those skilled in the art and may be external to or internal to the controller 120. The illustrative embodiment in FIG. 7 does not utilize a fixed communications device along the circuit. Rather, the user actuates an actuator 126 at the beginning of each lap. The actuation is coupled to controller 120, which sets a time reference at each actuation. The controller 120 then measures the time since the previous actuation as a lap time (or split time) and also increments a lap counter variable. An elapsed time is also counted. The lap count, split time and elapsed times are output by the controller 120 to the display 122 for viewing by the swimmer.

Figure 8:
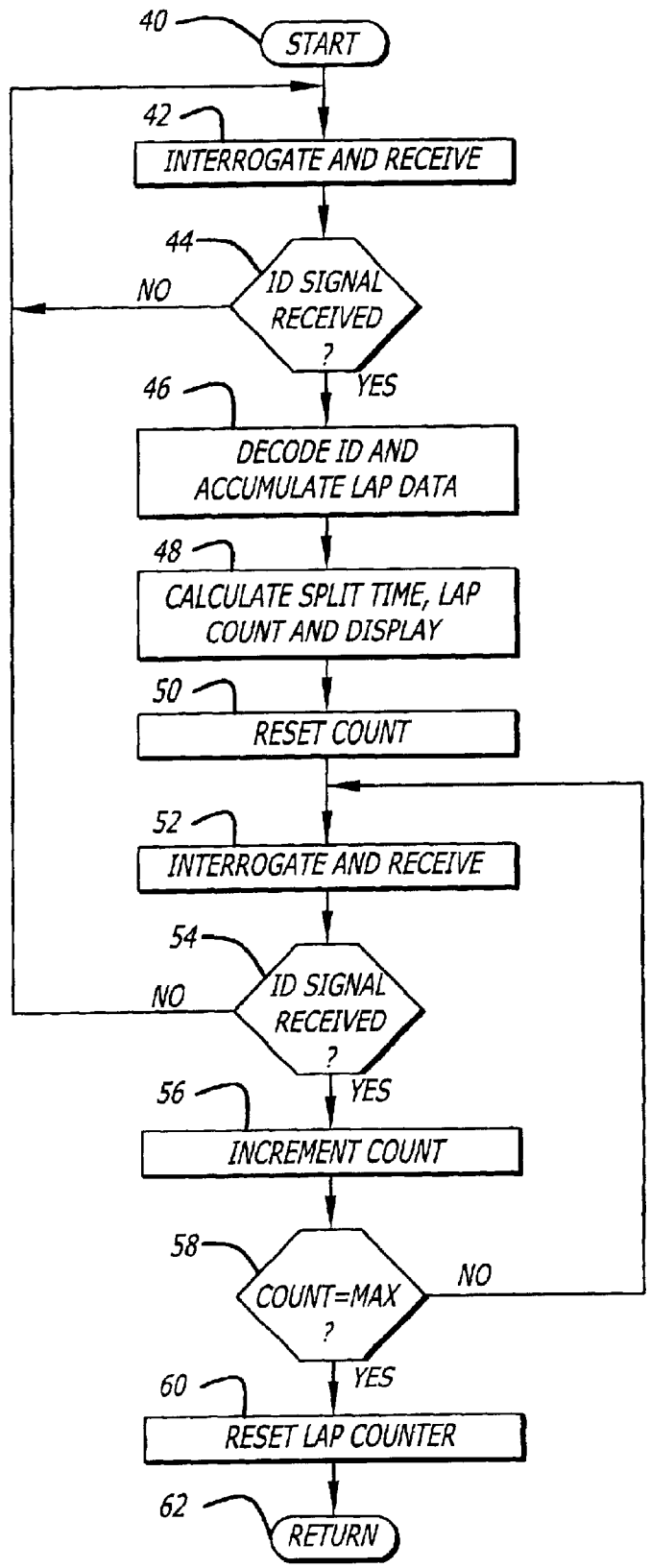
FIG. 8 is a flow diagram of an illustrative embodiment of the present invention.

Reference is directed to FIG. 8, which is a flow diagram of an illustrative embodiment of the present invention. The process illustrated in FIG. 8 relates to the transponder implementation of the present invention as described respecting FIG. 1. Those skilled in the art will appreciate that the process illustrated in FIG. 8 is also applicable to the transmitter implementation, with same differences noted above. The process is entered at step 40 and proceeds to step 42 where the lap counter and timer device interrogates and receives, looking for a transponder. At step 44, a test is conducted to determine if an identification signal has been received. If not, the interrogation step is repeated at step 42 and the cycle repeats until a signal is received at step 44. When a signal is received at step 44, it is indicative of the presence of a transponder, so the identification signal is decoded at step 46 to determine the transponder identity of the responsive transponder. Assuming there is a match in the identity, the receipt of the signal is marked with respect to time and accumulated in the lap data. The lap data includes the identity of the transponder and the time that such identity was realized, by coming into range of the lap counter and timer device. At step 48, the lap count is incremented to indicate the total number of laps completed, the split time is calculated with respect to the lap data gathered from the previous lap event, and the elapsed time since the beginning of the event is updated. Also at step 48, this information is displayed for the information of the user. Thus, as the event unfolds, the laps are individually tracked, the data stored, and the pertinent display information calculated and displayed.

Steps 50 through 60 in FIG. 8 implement the aforementioned temporal reset function of the present invention. When the transponder comes into range at step 44, the repetitive nature of the interrogation signal causes the lap counter and timer device to repeat the test so long as the transponder is within range, and thereafter as well. Therefore, at step 50, a counter is reset and the interrogation and receive operations are repeated at step 52. The decode step may or may not be repeated, the decision to do so being a design choice. At test is made at step 54 to determine if the identification has been received. If not, the process returns to step 42 to await the next lap event.

If the signal is received at step 54, then the counter is incremented at step 56. A test is conducted at step 58 to determine if the counter has reached a preset threshold. The threshold may be selected to specify a duration of time long enough to confidently indicated that the event is not a lap event and that the transponder (the swimmer) is resting at the starting position. If the counter has not reach the threshold, the process returns to step 52 to execute another interrogation cycle. On the other hand, at step 58, if the counter threshold is met, then the lap counter is reset at step 60 so that another event can be initialized. Then, at step 62, the process returns to a calling subroutine.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for monitoring the movement of an object traversing a circuit and outputting data with respect thereto, said system comprising:
   a first wireless communications device affixed to the object;
   a second wireless communications device operable to communicate with said first communications device when located within a predetermined proximity thereto;
   a controller operatively coupled to said first or said second communications device and adapted to monitor communications therebetween, and accumulate data therefrom; and
   an output device coupled to receive data from said controller, wherein the presence of said first communications device within said predetermined proximity of said second communications device for a period of time greater than a threshold duration causes said controller to start an elapsed time interval timer when said first communications device moves beyond said predetermined proximity of said second communications device.

2. The apparatus of claim 1 wherein said data is a lap count, a split time or an elapsed time.

3. The apparatus of claim 2 further comprising a user input coupled to said controller and wherein activation of said user input causes said controller to reset said lap count and initialize a starting sequence.

4. The apparatus of claim 3 wherein said controller is operable to execute a count down timer before initializing said starting sequence.

5. The apparatus of claim 1 wherein the object is a person or a swimmer.

6. The apparatus of claim 1 wherein said first communications device and said second communications device are enclosed in waterproof housings.

7. The apparatus of claim 1 wherein said output device is a visual display.

8. The apparatus of claim 7 further comprising a means for activating said display while said communications devices are located within said predetermined proximity of one another.

9. The apparatus of claim 1 further comprising an input/output interface coupled to said controller, said input/output interface operable to communicate said data to an external device.

10. The apparatus of claim 1 wherein said first communications device is operable to communicate unique identification codes as a part of said data.

11. The apparatus of claim 10 wherein said controller is operable to decode a plurality of said unique identification codes and operable to accumulate a plurality of data sets corresponding thereto.

12. The apparatus of claim 1 wherein said first communications device is a transponder and said second communications device is a transceiver, and wherein said controller is coupled to and co-located with said transceiver and said output device.

13. The apparatus in claim 12 wherein said transceiver is adapted to interrogate said transponder.

14. The apparatus of claim 1 further comprising:
   a physiologic sensor coupled to said first communications device and is operable to communicate physiologic data there through, and wherein
   said controller is coupled to and co-located with said second communications device and said output device, and said controller is operable to receive said physiologic data that has been communicated by wireless communications, and wherein said controller outputs processed physiologic data to said output device.

15. The apparatus of claim 14 wherein said physiologic data is heart rate or blood-oxygen level data.

16. The apparatus of claim 14 wherein said physiologic sensor is a finger cot sensor.

17. The apparatus of claim 14 wherein said output device is a visual display incorporated into an item of eyewear.

18. The apparatus of claim 17 wherein the object is a person swimming in a water circuit, and said eyewear is swimmer's goggles.

19. The apparatus of claim 1 further comprising:
   a physiologic sensor coupled to said controller, and wherein
   said second communications device is a transponder and said first communications device is a transceiver adapted to interrogate said transponder, and wherein
   said controller is coupled to and co-located with said first communications device and said output device, and wherein
   said controller receives physiologic data from said physiologic sensor and outputs processed physiologic data to said output device.

20. The apparatus of claim 19 wherein said physiologic data is heart rate or blood-oxygen level data.

21. The apparatus of claim 19 wherein said physiologic sensor is a finger cot sensor.

22. The apparatus of claim 19 wherein said output device is a visual display incorporated into an item of eyewear.

23. The apparatus of claim 22 wherein the object is a person swimming in a water circuit, and said eyewear is swimmer's goggles.

24. A method of accumulating and outputting data related to an object traversing a circuit wherein a first wireless communications device is affixed to the object and a second wireless communications device is fixed and operable to communicate with the first communications device when located within a predetermined proximity thereto, comprising the steps of:
   determining the presence of the first communications device within the predetermined proximity by establishment of a wireless communications link with the second communications device;
   communicating an identification signal to identify the first communications device;
   starting an elapsed time interval timer when the first communications device is within the predetermined proximity of the second communications device for a period of time greater than a threshold duration and then moves beyond the predetermined proximity;
   accumulating successive identification signals as lap interval data; and
   outputting said lap interval data to the output device.

25. The method of claim 24 wherein said lap interval data is a lap count, a split time or an elapsed time.

26. The method of claim 25 further comprising the step of activating a user input to reset said lap count thereby initializing a starting sequence.

27. The method of claim 26 further comprising the step of executing a count down timer before initializing said starting sequence.

28. The method of claim 24 wherein the object is a person or a swimmer.

29. The method of claim 24 wherein said first communications device and said second communications device are enclosed in waterproof housings.

30. The method of claim 24 wherein said output device is a visual display.

31. The method of claim 24 further comprising the step of activating the display while the communications devices are located within said predetermined proximity of one another.

32. The method of claim 24 further comprising the step of decoding a plurality of unique identification codes and accumulating a plurality of data sets corresponding thereto.

33. The method of claim 24 wherein said first communications device is a transponder and said second communications device is a transceiver.

34. The method in claim 33 wherein said transceiver is adapted to interrogate said transponder.

35. The method of claim 24 wherein a physiologic sensor is coupled to the first communications device, further comprising the steps of:

transmitting physiologic data from the first communications device to the second communications device and outputting the physiologic data to the output device.

36. The method of claim 35 wherein said physiologic data is heart rate or blood-oxygen level data.

37. The method of claim 35 wherein said physiologic sensor is a finger cot sensor.

* * * * *